UNITED STATES PATENT OFFICE.

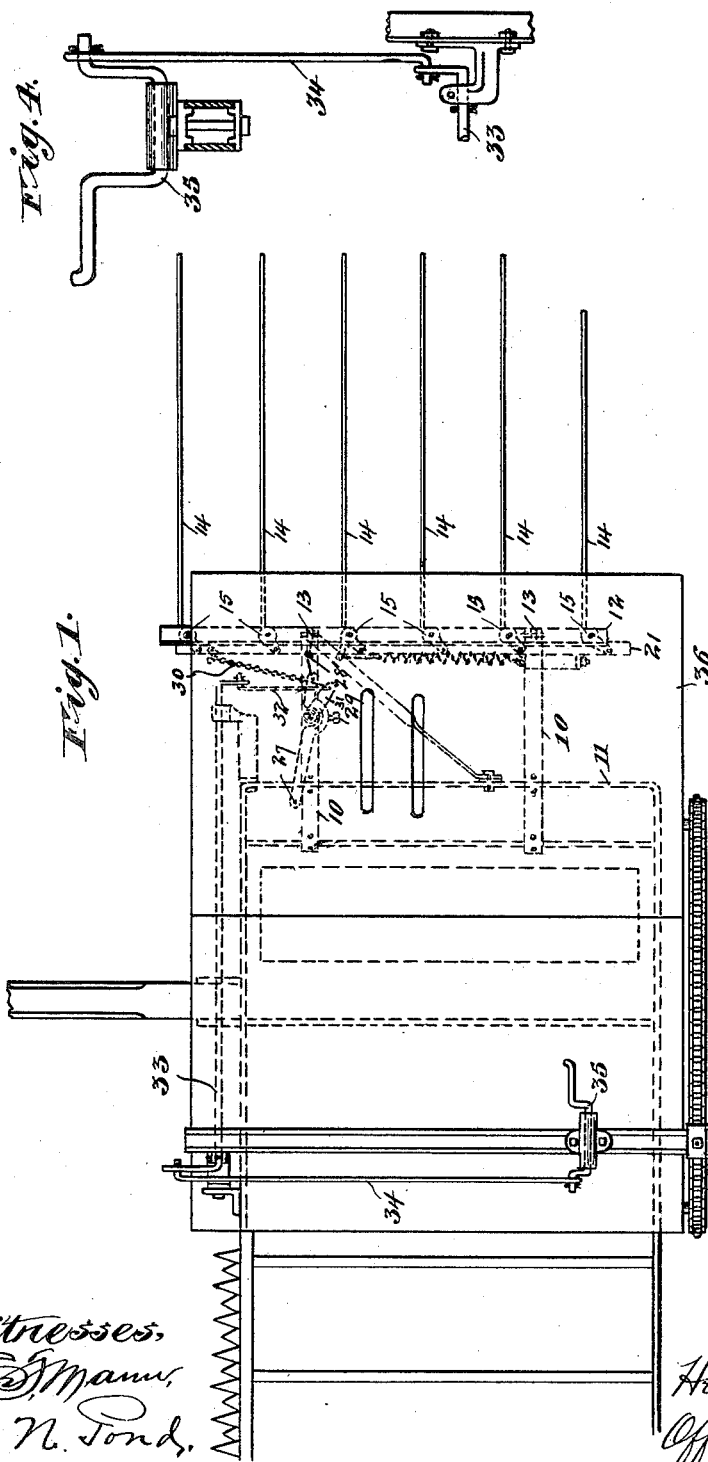

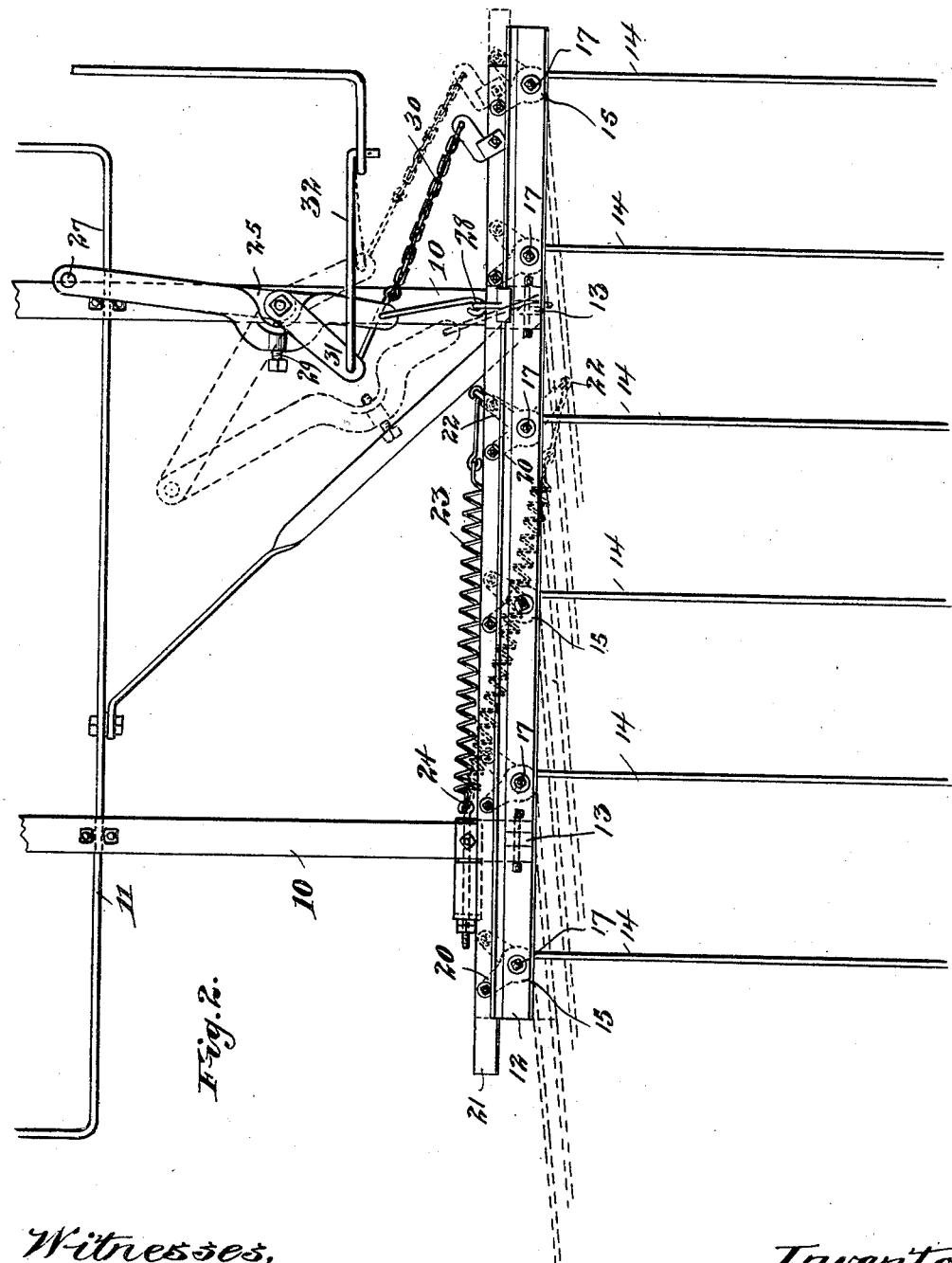

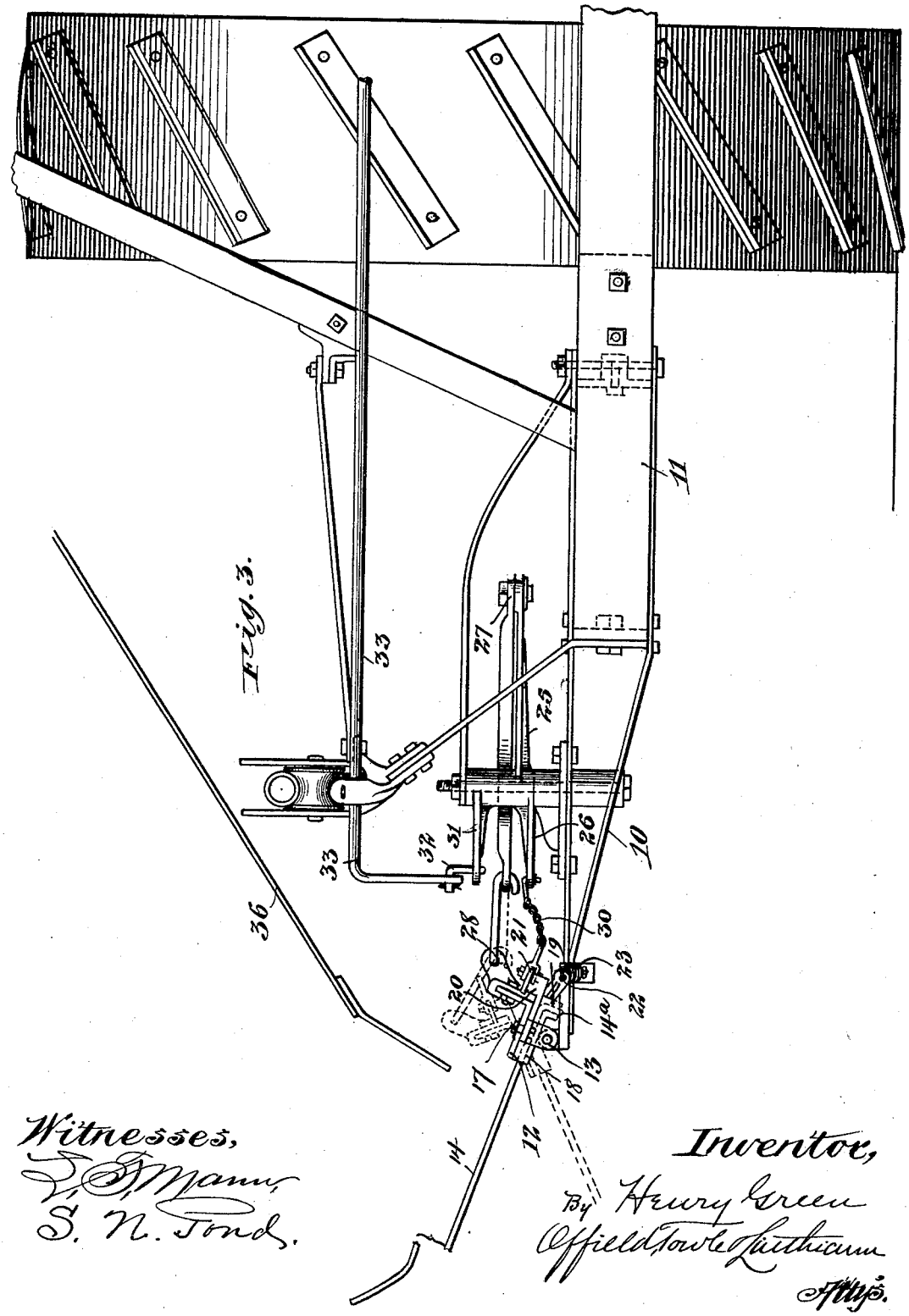

HENRY GREEN, OF PEKIN, ILLINOIS, ASSIGNOR TO THE ACME HARVESTER COMPANY, OF PEORIA, ILLINOIS, A CORPORATION OF ILLINOIS.

BUNDLE-CARRIER FOR HARVESTERS.

SPECIFICATION forming part of Letters Patent No. 697,142, dated April 8, 1902.

Application filed April 25, 1901. Serial No. 57,372. (No model.)

*To all whom it may concern:*

Be it known that I, HENRY GREEN, a citizen of the United States, and a resident of Pekin, Illinois, have invented certain new and useful Improvements in Bundle-Carriers for Harvesters, of which the following is a specification.

My invention relates to that class of bundle-carriers wherein a series of tines are pivotally mounted upon the tine-supporting bar in such manner that the tines may be folded in line with the longitudinal axis of the bar and which are provided with cranks, the several cranks being connected together by a bar common to all and which is herein designated as a "tine-folding" bar.

It is the object of my invention to construct a bundle-carrier of this kind in such manner that the several tines may be dropped in order to carry the bundles away from the machine before the tines begin to fold.

A further object of my invention is to provide a spring which shall serve to fold the tines after they have deposited the bundles and which shall also serve to extend the tines or cause them to recover their normal position after the tine-supporting bar has been restored to its normal position.

My invention is shown in the accompanying drawings, in which—

Figure 1 is a plan view of so much of a harvester as is necessary to the understanding of my invention. Fig. 2 is a plan view of the bundle-carrier, the dotted lines indicating a secondary position. Fig. 3 is an elevation showing portions of the binder-frame and showing the bundle-carrier in end view. Figs. 4, 5, 6, and 7 are detail views, Fig. 4 showing the foot-treadle and its connection to the bundle-carrier rock-shaft. Fig. 5 is an end view of said rock-shaft, showing the connection to the foot-treadle and to the bundle-carrier. Figs. 6 and 7 show, respectively, a plan and an edge view of a pivot lug or bracket for one of the tines.

Carrying out my invention, the bundle-carrier may be mounted upon bearers 10, extending from the binder-frame 11. The bundle-carrier proper comprises the tine-supporting bar 12, which, as shown, is an angle-bar, which is hinged, as shown at 13, to the bearers 10, so that the angle-bar may rock. Pivotally mounted upon this tine-supporting bar are a series of tines 14, each of which is secured to a bracket 15, whose general form is sufficiently indicated in Figs. 6 and 7, the bracket or casting shown in that figure having, however, an additional crank-arm not provided upon the other brackets. Each of these brackets has a perforation 16 through its body, through which the pivot-pin 17 passes, and also an aperture 18, through which the body of tine 14 passes, the end of the tine being downturned, as shown at 14$^a$, Fig. 3, and then secured by a pin, as shown at 19. Each of the brackets 15 has a crank-arm 20, which is pivotally connected with the tine-folding bar 21. One of the brackets is also provided, as shown in Figs. 6 and 7, with a crank-arm 22, and a spring 23 is connected to one end of said crank and to the framework 10, as shown at 24. The length of the crank-arm 22 and the point of connection of the opposite end of the spring 23 is such that when the tines are extended, as shown in Fig. 2, the spring exerts a tendency to hold them extended and to sustain them under the weight of the bundles; but when the tines are folded, as shown by the dotted lines in said figure, then the end of the crank-arm 22 is carried beyond a plane passing through the pivotal axis of the bracket 15 and the point of connection 24, and the result is that during the closing movement of the tines the spring assists to fold them. Thus the spring is active and exerts its greatest force upon the tines when in their extreme position.

In order to rock the tine-supporting bar upon its pivots, so as to drop the tines upon the ground before the folding action begins, I employ by preference the following instrumentalities: Upon one of the bearers 10 is mounted upon a vertical pivot a bell-crank or a double-arm lever, the arms of which are marked 25 and 26, the former of which is connected by a jointed link, the joints of which are marked 27 28, with the tine-supporting bar. The link 27 is notched at its central portion, as shown in Fig. 2, and an adjustable stop in the form of a set-screw 29 is threaded through the substance of the link opposite the hub of the double-arm lever or bell-crank. The arm 26 is connected by a flexible connection, such as the chain 30, with the tine-folding bar 21. The bell-crank has a third arm 31, which is connected by a link-rod 32 with the rock-shaft 33, and the latter, as shown in Fig. 4, is connected by the rod 34 with the foot treadle or crank 35.

The relations of the pivotal axis of the bell-crank lever and the connection of the link 27 with the arm 25 and the tine-supporting bar are such than when the tines are extended the outer end of said arm is carried beyond a plane passing through the axis of the bell-crank and the point of connection with the link to the tine-supporting bar, thus constituting a lock. Of course the farther said end of the lever is carried beyond such line the more difficult the lock will be to break, and the adjusting-screw affords means for setting the mechanism so that it will be as sensitive as desired.

The various parts are so adjusted that in the normal position the tines are extended at right angles to their supporting-bar and are elevated above the ground, as shown in Fig. 3, at the proper angle or inclination to support the bundles which are delivered from the grain-deck. (Shown at 36.) In this position the lock formed by the arm 25 and the crank 27 tends to hold the tine-supporting bar in a position to keep the tines elevated, while the spring 23 holds the tines extended. When a sufficient number of bundles have accumulated, the driver will trip the foot-lever, thus imparting a positive movement sufficient to break the lock formed by the bell-crank and its connections, and the weight of the bundles will instantly cause the tines to drop at their outer ends and the bundles will slide down the tines, being carried away from the machine. The forward movement of the machine tends to fold the tines by reason of their trailing contact with the stubble or earth, and this will cause the end of the spring which is attached to the bracket mounted upon the tine-supporting bar to be carried past the pivotal axis of the bracket, as shown in Fig. 2, and as soon as it passes the center it will exert a strong force to fold the tines up closely against the under side of the bar, as shown in Fig. 2. The tines are thus folded quickly and entirely clear of the ground and the gavels or the bundles of grain, and they may be extended over the gavels without being impeded thereby. The driver through the foot-treadle exerts sufficient force to rock the tine-supporting bar on its pivots, thus bringing it back into position for the unfolding or extending of the tines, and as it passes into position the flexible link or chain 30 becomes taut and shifts the tine-folding bar sufficiently to cause the swinging end of the spring 23 to pass the center, and the spring thereupon becomes effective to cause the tines to recover their normal or extended position.

It may be observed that the only force which need be exerted by the driver is to trip the bundle-carrier-operating mechanism sufficiently to break the lock of its connections, an operation requiring only slight force, and, second, to exert sufficient force to rock the tine-supporting bar upon its axis, an operation also requiring very slight force.

Among the advantages of the construction above described the following may be noted: The tines are dropped to the ground before the folding commences, and the bundles are thus carried away from the machine, so that they are kept clear of the path of the draft-animals upon the next round and also so far away from the machine that they are made to sufficiently clear the tines. By mounting the tine-supporting bar so as to rock in its bearing this load is discharged in the manner above described, and the position of the tine-supporting bar is recovered, while the tines are folded compactly, so as to require but slight leverage.

I claim—

1. In a bundle-carrier for harvesters the combination with a rocking tine-supporting bar, tines pivotally mounted thereon, and adapted to fold substantially in line therewith, a tine-folding bar, a pivoted lever, a connection between said lever and the tine-supporting bar, and a flexible connection between the lever and the tine-folding bar, and means for rocking said lever on its pivot whereby the tine-supporting bar is rocked to lower the outer ends of the tines into contact with the stubble before the folding of the tines begins, substantially as described.

2. In a bundle-carrier the combination with a rocking tine-supporting bar, tines pivotally mounted thereon and adapted to be folded substantially in line therewith, a tine-folding bar having crank connection with the several tines, a pivoted bell-crank, a link pivotally connecting one arm of the bell-crank with the tine-supporting bar, and a flexible connection between the other arm of the bell-crank and the tine-folding bar, a crank-arm connected to the tine-folding bar, and a spring connected to said crank-arm and tending to fold the tines at the conclusion of the rocking movements of the tine-supporting bar, substantially as described.

3. In a bundle-carrier the combination with a rocking tine-supporting bar, of tines pivotally mounted thereon and adapted to fold substantially in line therewith, crank-arms connected with said tines, a tine-folding bar connecting the several tine-cranks, a bell-crank lever, a pivoted link connecting one arm of said lever and the tine-supporting bar, and a flexible connection between the other arm of the bell-crank and the tine-folding bar, means for rocking said lever upon its pivot, and the pivoted connections of the link being so disposed that the end thereof which is connected to the bell-crank is carried beyond a plane passing through the axis of the bell-crank and the point of connection to the tine-folding bar when the tines are extended, whereby to provide a lock, substantially as described.

4. In a bundle-carrier for self-binding harvesters, the combination with a supporting-frame, of a tine-supporting bar mounted to rock upon said frame, tines pivoted upon said bar and having cranks, a tine-folding bar connecting the several cranks, a bell-crank lever pivoted to rock about the axis of one of the tines and having one of its arms connected to the tine-folding bar, a spring having one end connected at a fixed point and the other connected to one arm of the bell-crank, and the pivotal connections being so disposed that in folding the tines one end of the spring is carried beyond a line passing through its fixed point of connection and the axis of the bell-crank, substantially as described.

5. In a bundle-carrier the combination with a rocking tine-supporting bar and folding tines carried thereby, of means for rocking the supporting-bar and shifting the folding-bar, said means comprising a bell-crank having arms extended from its pivot, one toward and the other away from the carrier, a link connecting the outer end of the arm extending away from the pivot with the tine-supporting bar, and an adjustable stop for regulating the movement of said link, substantially as described.

HENRY GREEN.

Witnesses:
C. C. LINTHICUM,
E. L. DIETRICH.